United States Patent Office 2,887,484
Patented May 19, 1959

2,887,484

BENZODIOXAN DERIVATIVES

Albert Funke, Paris, France, assignor to Societe des Usines Chimiques Rhone-Poulenc, Paris, France, a French body corporate No Drawing. Application January 8, 1958
Serial No. 707,675

Claims priority, application France January 8, 1957

5 Claims. (Cl. 260—247.7)

This invention relates to new benzodioxan derivatives and processes for their preparation.

According to the present invention there are provided new benzodioxan derivatives of the general formula:

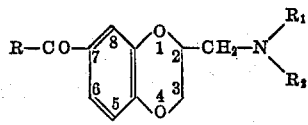

(wherein R represents an aliphatic, aromatic (preferably phenyl) or an aliphatic hydrocarbon group, which may be substituted, for example, by an alkoxy group, $R_1$ and $R_2$ are the same or different and either each represents a lower alkyl or cycloalkyl group or one of $R_1$ and $R_2$ represents a hydrogen atom and the other represents a lower alkyl or cycloalkyl group or $R_1$ and $R_2$ together with the adjacent nitrogen atom collectively represent a mononuclear saturated heterocyclic group such as a pyrrolidino, piperidino, morpholino, piperazino or 4-alkylpiperazino group) and their salts and quaternary ammonium derivatives. The term "lower alkyl" as used in this specification means alkyl groups containing not more than four carbon atoms.

According to a feature of the present invention the benzodioxan derivatives of general Formula I are prepared by reacting an amine of the general formula

wherein $R_1$ and $R_2$ are as hereinbefore defined with a benzodioxan compound of the general formula:

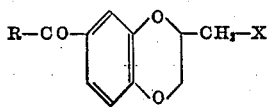

wherein X represents the acid residue of a reactive ester such as a halogen atom or a sulphuric or sulphonic ester residue, and R is as hereinbefore defined.

The reaction may be carried out by simply bringing the reagents into contact at a moderate temperature with or without an inert solvent and in the presence or absence of a basic condensing agent. It is advantageous, however, to effect the reaction in a solvent medium or to employ an excess of the amine which excess neutralises the acid liberated by the reaction. When the amine is volatile it may be advantageous to operate under pressure, for example, in an autoclave.

When a quaternary ammonium derivative of the benzodioxan of Formula I is desired, it may be obtained directly by reacting a tertiary amine of the formula

where Q represents the quaternating residue, with the benzodioxan compound of Formula II.

The benzodioxan starting materials of Formula II may be obtained, for example, by the following methods:

(a) By the action of a halogenating agent such as phosphorus pentachloride or thionyl chloride, or an acid halide, in particular a sulphonic acid halide, on an alcohol of the general formula:

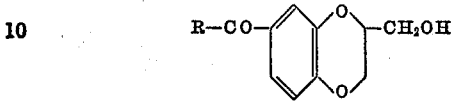

where R is as hereinbefore defined.

The alcohols of Formula III may themselves be prepared by the action of an epihalohydrin or an $\alpha,\gamma$-dihalohydrin of glycerine on a 4-acylpyrocatechol.

(b) By acylation of a benzodioxan of the general formula:

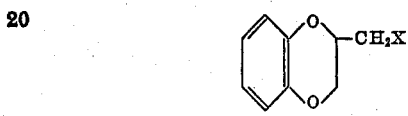

preferably by the action of a halide or an anhydride of an acid of general formula R—COOH, in the presence of a catalyst such as a metal halide (in particular, ferric chloride or aluminum chloride) or boron trifluoride.

Generally these methods result in a mixture of isomers of the formulae:

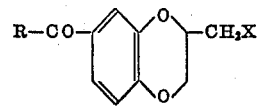

and

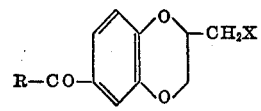

but, as it is not convenient to separate them, the mixture may be treated directly with the amine

The benzodioxan derivatives conforming to Formula I may be separated from the isomers derived from the benzodioxan compounds of Formula VI by conventional methods of fractional separation; in particular, by crystallisation of a salt such as the hydrochloride.

According to a further feature of the present invention the benzodioxan derivatives of general Formula I wherein $R_1$ and $R_2$ represent lower alkyl or cycloalkyl groups or one of $R_1$ and $R_2$ represents a hydrogen atom and the other represents a lower alkyl or cycloalkyl group are prepared by the action of an alkylating (including cycloalkylating) agent upon a corresponding primary amine conforming to the formula:

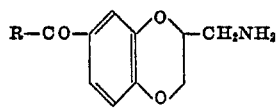

(wherein R is as hereinbefore defined). The primary amines of Formula VII may be obtained by treating benzodioxan compounds conforming to Formula II with ammonia.

The new benzodioxan derivatives of the present invention possess remarkable pharmacodynamic properties and are useful in particular as analgesics, their activity closely approaching that of morphine. Those compounds in which R is phenyl or alkoxyphenyl and the grouping

represents a mononuclear saturated heterocyclic group such as pyrrolidino, piperidino, morpholino, piperazino or 4-alkylpiperazino are of outstanding value.

For therapeutic purposes, the bases of general Formula I are preferably employed in the form of acid addition salts containing anions which are relatively innocuous to the animal organism in therapeutic doses of the salts (such as hydrochlorides and other hydrohalides, phosphates, nitrates, sulphates, maleates, fumarates, citrates, tartrates, oxalates, methanesulphonates and ethanedisulphonates) so that the beneficial physiological properties inherent in the bases are not vitiated by side-effects ascribable in the anions, or of quaternary ammonium salts obtained by reaction with organic halides (e. g. methyl or ethyl iodide, chloride or bromide or allyl or benzyl chloride or bromide) or other reactive esters.

The following examples, in which the melting points indicated were determined on the Kofler micro-block, illustrate the invention:

*Example I*

A mixture of 4-benzoyl-pyrocatechol (53.5 g.), potassium hydroxide (28 g.) and water (30 g.) is heated under a current of nitrogen at about 100–110° C. until solution is complete. α,γ-Dichlorohydrin of glycerine (35.5 g.) is added in small portions and the mixture is heated under reflux for 3 to 4 hours. After cooling, water is added and the product is extracted with ethyl acetate. The solution is decanted, washed with dilute sodium hydroxide and water, dried and the solvent is evaporated. Crude 2-hydroxymethyl-7-benzoyl-benzodioxan (55 g.) is recovered in the form of a thick oil.

The aforesaid alcohol (8.2 g.) is dissolved in pyridine (2.4 g.) and thionyl chloride (2.2 g.) added in small portions with cooling. The product is heated on a waterbath for 2 to 3 hours. After cooling, the mixture is treated with water and extracted with benzene. The solvent is evaporated and the residue distilled. Crude 2-chloromethyl-7-benzoyl-benzodioxan (7 g.) is obtained, B.P. 195–210° C./0.04 mm. Hg.

This chloromethylated derivative (11 g.) is dissolved in an excess of piperidine and heated overnight in a sealed tube at between 110 and 120° C. After cooling, the product is extracted with ether. The ethereal solution is washed with water, extracted with 5 N hydrochloric acid and the base precipitated from the aqueous acid solution with an excess of sodium hydroxide. The free base is extracted with ether and the ethereal solution washed with water, dried and treated with a current of gaseous hydrogen chloride. The precipitated hydrochloride is separated, washed with ether and recrystallized several times from ethanol. 2-piperidinomethyl-7-benzoyl-benzodioxan hydrochloride (6 g.), M.P. 235° C., is thus obtained.

By evaporation of the alcoholic mother liquors of the recrystallisation of the hydrochloride the 2:6-isomer is isolated, M.P. 193° C.

*Example II*

Powdered aluminum chloride (33 g.) is added over 1 hour to a mixture of 2-chloromethyl-benzodioxan (50 g.), carbon disulphide (400 cc.) and benzoyl chloride (36 g.), which is shaken and cooled to 0° C., the temperature being kept at 5–8° C. At the end of this addition the solution is agitated for several hours and allowed to stand overnight.

The reaction product is decomposed by ice and concentrated hydrochloric acid. The carbon disulphide layer is separated and washed with a sodium carbonate solution and water. After drying and evaporation of the solvent, the product is distilled in vacuo. Crude 2-chloromethyl-7-benzoyl-benzodioxan (39 g.), B.P. about 210° C. under 0.01 mm. Hg is recovered.

By treating this chloromethylated derivative with piperidine as in Example I, 2-piperidinomethyl-7-benzoyl-benzodioxan (25 g.), M.P. 235° C., is obtained. The identity of the product with that of the product obtained in Example I is shown by the absence of depression of the melting point of a mixture of the two hydrochlorides. It is possible to isolate the 2:6-isomer, which melts at 193° C., from the mother liquors of the crystallisation of the hydrochloride.

Proceeding as above the following compounds may be obtained:

2-morpholinomethyl - 7 - benzoyl-benzodioxan hydrochloride, M.P. 182° C., the 2:6-isomer of which melts at 172° C.;

2-piperidinomethyl - 7 - p-methoxybenzoyl-benzodioxan hydrochloride, M.P. 180° C., and 2 - morpholinomethyl-7-p-methoxybenzoyl-benzodioxan hydrochloride, M.P. 162° C.

I claim:
1. 2-piperidinomethyl-7-benzoyl-benzodioxan.
2. 2-morpholinomethyl-7-benzoyl-benzodioxan.
3. 2-piperidinomethyl - 7 - p-methoxybenzoyl-benzodioxan.
4. 2-morpholinomethyl - 7 - p-methoxybenzoyl-benzodioxan.
5. Benzodioxan derivatives of the general formula:

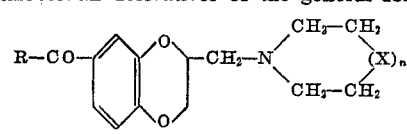

wherein R is selected from the class consisting of alkyl groups containing at most 4 carbon atoms, phenyl, alkylphenyl groups in which the alkyl group contains at most 4 carbon atoms and alkoxyphenyl groups in which the alkoxy group contains at most 4 carbon atoms, X is a group selected from the class consisting of —$CH_2$—, —O—, —NH—, —N($CH_3$)— and —N($C_2H_5$)— and $n$ is selected from nought and one.

References Cited in the file of this patent
UNITED STATES PATENTS 2,056,046    Fourneau _____ Sept. 29, 1936